US012777544B2

(12) United States Patent
Jiang

(10) Patent No.: US 12,777,544 B2
(45) Date of Patent: Oct. 27, 2026

(54) METHOD FOR PROCESSING UPLINK DATA AND DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 18/281,937

(22) PCT Filed: Mar. 15, 2021

(86) PCT No.: PCT/CN2021/080833
§ 371 (c)(1),
(2) Date: Sep. 13, 2023

(87) PCT Pub. No.: WO2022/193078
PCT Pub. Date: Sep. 22, 2022

(65) Prior Publication Data
US 2024/0155720 A1 May 9, 2024

(51) Int. Cl.
*H04W 76/20* (2018.01)
*H04W 28/02* (2009.01)
*H04W 74/08* (2024.01)
*H04W 74/0833* (2024.01)

(52) U.S. Cl.
CPC ....... *H04W 76/20* (2018.02); *H04W 28/0278* (2013.01); *H04W 74/0833* (2013.01); *H04W 74/0875* (2013.01)

(58) Field of Classification Search
None
See application file for complete search history.

(56) References Cited

U.S. PATENT DOCUMENTS

2020/0260498 A1* 8/2020 Xu .................... H04W 74/0836
2022/0039192 A1* 2/2022 Palat ................. H04W 12/0431
2022/0182876 A1* 6/2022 Lei ........................ H04L 1/0007
2022/0361239 A1* 11/2022 Xu ........................ H04W 76/27
2023/0164773 A1* 5/2023 Alfarhan ........... H04W 74/0833 370/329
2023/0199900 A1* 6/2023 Park ...................... H04W 72/21 370/329
2023/0389117 A1* 11/2023 Laselva ................. H04W 74/08
2024/0090066 A1* 3/2024 Yi ..................... H04W 28/0278

FOREIGN PATENT DOCUMENTS

KR 10-2021-0033342 * 3/2021

OTHER PUBLICATIONS

Author Unknown, Subsequent data transmission for SDT, Doc No. R2-2009657, pp. 1-3, (Nov. 13, 2020).*
(Continued)

*Primary Examiner* — Christopher M Crutchfield
(74) *Attorney, Agent, or Firm* — Cozen O'Connor

(57) ABSTRACT

A method for processing uplink data includes sending first indication information to a network device during a small data transmission (SDT) process. The first indication information indicates whether a non small data transmission data radio bearer (non SDT DRB) on the terminal device carries uplink data to be sent

19 Claims, 4 Drawing Sheets

(56) References Cited

OTHER PUBLICATIONS

Author Unknown, Handling of subsequent small data transmission in RRC_INACTIVE, Doc No. R2-2008935, pp. 1-3, (Nov. 13, 2020).*
Author Unknown, Subsequent transmissions after initial SDT, Doc No. R2-2009965, pp. 1-7, (Nov. 13, 2020).*
Author Unknown, Discussion on subsequent small data transmission, Doc No. R2- 2010429, pp. 1-2, (Nov. 13, 2020).*
PCT/CN2021/080833, International Search Report dated Dec. 22, 2021, 2 pages.
CATT "User plane common aspects of SDT" 3GPP TSG-RAN WG2 Meeting #113 electronic, R2-2100294, Jan. 2021, 4 pages.
LG Electronics Inc. "Subsequent data transmission and indication for non-SDT DRBs" 3GPP TSG-RAN2 #113e, R2-2101513, Jan. 2021, 4 pages.
European Patent Application No. 21930675.0, Search and Opinion dated Mar. 26, 2024, 13 pages.
Mediatek Inc. "Handling of non-SDT DRB"3GPP TSG-RAN WG2 #113-e, R2- 2102230, Jan.-Feb. 2021, 3 pages.

* cited by examiner

METHOD FOR PROCESSING UPLINK DATA AND DEVICE

CROSS REFERENCE TO RELATED APPLICATION

This application is a US national phase application of International Application No. PCT/CN2021/080833, filed on Mar. 15, 2021, the entire content of which is hereby incorporated by reference.

TECHNICAL FIELD

The present disclosure relates to the field of communication technologies, and more particularly, to a method for processing uplink data and a device thereof.

BACKGROUND

In a communication system, a terminal device may be configured with a plurality of data radio bearers (DRBs). The DRB may be classified into a small data transmission (SDT) DRB and a non small data transmission (non SDT) DRB based on manners of sending data,

SUMMARY

According to a first aspect, an embodiment of the present disclosure provides a method for processing uplink data, performed by a terminal device. The method includes:

sending first indication information to a network device during a small data transmission (SDT) process, in which, the first indication information is configured to indicate whether a non small data transmission data radio bearer (non SDT DRB) on the terminal device carries uplink data to be sent as much as possible.

According to a second aspect, an embodiment of the present disclosure provides a method for processing uplink data, performed by a network device. The method includes:

receiving first indication information sent by a terminal device during a small data transmission (SDT) process, in which, the first indication information is configured to indicate whether a non small data transmission data radio bearer (non SDT DRB) on the terminal device carries uplink data to be sent.

According to a third aspect, an embodiment of the present disclosure provides a communication device. The communication device includes a processor and a memory having a computer program stored thereon. The processor is configured to executes the computer program stored in the memory, causing the device to implement: sending first indication information to a network device during a small data transmission (SDT) process, wherein the first indication information indicates whether a non small data transmission data radio bearer (non SDT DRB) on the terminal device carries uplink data to be sent.

BRIEF DESCRIPTION OF THE DRAWINGS

In order to explain the technical solutions in embodiments of the present disclosure or the background, the accompanying drawings required in embodiments of the present disclosure or the background will be explained below.

DETAILED DESCRIPTION

Embodiments of the present disclosure will be described in detail below, examples of which are illustrated in the accompanying drawings. The same or similar reference numbers represent the same or similar elements or elements with the same or similar functions throughout the description. Embodiments described below with reference to the accompanying drawings are illustrative, are intended to explain the present disclosure and cannot be understood as limiting the present disclosure.

For ease of understanding, terms related to the present disclosure are introduced first.

1. Radio Resource Control (RRC)

The RRC, also known as radio resource management (RRM) or radio resource allocation (RRA), refers to management, control, and scheduling of wireless resources through certain strategies and means, making full use of limited wireless network resources as much as possible while meeting requirements of quality of service to ensure reaching a planned coverage area and improving a business capacity and a resource utilization rate as much as possible.

2. Data Radio Bearer (DRB)

The DRB may be configured to send business data of a terminal device.

3. Signaling Radio Bearer (SRB)

The SRB, as a special radio bearer, is only configured to transmit messages of RRC and non access stratum (NAS).

In order to better understand a method for processing uplink data proposed in an embodiment of the present disclosure, a communication system used in an embodiment of the present disclosure will be described below.

Figure 1:
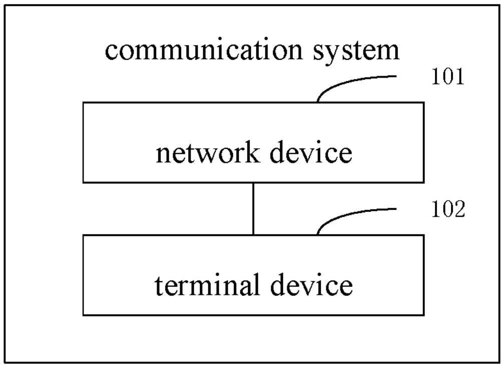
FIG. 1 is a schematic diagram illustrating an architecture of a communication system provided in an embodiment of the present disclosure.

FIG. 1 is a schematic diagram illustrating an architecture of a communication system provided in an embodiment of the present disclosure.

The communication system may include, but is not limited to, a network device and a terminal device. A number and a form of devices as illustrated in FIG. 1 are for example only and do not constitute a limitation to embodiments of the present disclosure. In practical applications, the system may include two or more network devices and two or more terminal devices. The communication system as illustrated in FIG. 1 takes including one network device 101 and one terminal device 102 as an example.

It should be noted that the technical solution of embodiments of the present disclosure may be applied to various communication systems, for example, a long term evolution (LTE) system, a 5th generation (5G) mobile communication system, a 5G new radio (NR) system, or other future new mobile communication systems.

The network device 101 in embodiments of the present disclosure is a physical device for transmitting or receiving signals on a network side. For example, the network device 101 may be an evolved NodeB (eNB), a transmission reception point (TRP), a next generation NodeB (gNB) in an NR system, base stations in other future mobile communication systems, or access nodes in wireless fidelity (WiFi) systems. Embodiments of the present disclosure do not limit a specific technology and a specific device form adopted by the network device. The network device provided in embodiments of the present disclosure may be composed of a central unit (CU) and a distributed unit (DU). The CU may also be referred to as a control unit. The network device, such as a protocol layer of a base station, may be separated through a CU-DU structure. Some functions in the protocol layer may be controlled centrally by the CU, and the remaining or all functions in the protocol layer may be distributed within the DU which is centrally controlled by the CU.

The terminal device 102 in embodiments of the present disclosure is physical device for receiving or transmitting signals on a user side, such as a mobile phone. The terminal device may also be referred to as a terminal, a user equipment (UE), a mobile station (MS), a mobile terminal (MT), etc. The terminal device may be a vehicle with a communication feature, a smart vehicle, a mobile phone, a wearable device, a pad, a computer with a wireless transceiver feature, a virtual reality (VR) terminal, an augmented reality (AR) terminal, a wireless terminal in industrial control, and a wireless terminal in self-driving, a wireless terminal in remote medical surgery, a wireless terminal in smart grid, a wireless terminal in transportation safety, a wireless terminal in smart city, and a wireless terminal in smart home. Embodiments of the present disclosure do not limit a specific technology and a specific device form adopted by the terminal device.

It can be understood that the communication system described in embodiments of the present disclosure are intended to provide a clearer explanation of the technical solution of embodiments of the present disclosure, and does not constitute a limitation on the technical solution proposed in embodiments of the present disclosure. As those ordinary skilled in the art know, with evolution of the system architecture and emergence of new business scenarios, the technical solution proposed in embodiments of the present disclosure is also applicable to the similar technical problem.

A method for processing uplink data, a device provided in the present disclosure are described in detail with reference to the accompany drawings below.

Figure 2:
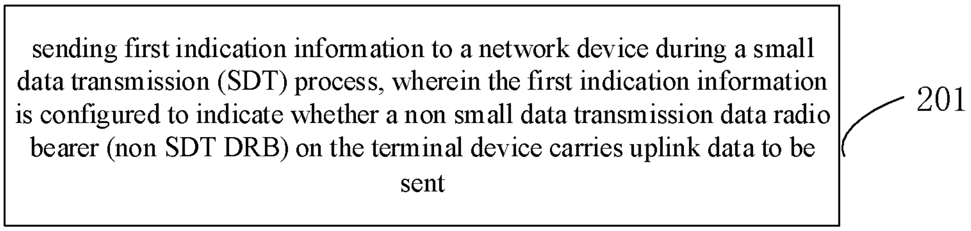
FIG. 2 is a flowchart illustrating a method for processing uplink data according to an embodiment of the present disclosure.

FIG. 2 is a flowchart illustrating a method for processing uplink data according to an embodiment of the present disclosure. The method may be performed by a terminal device. As illustrated in FIG. 2, the method may include the following step.

At step 201, first indication information is sent to a network device during a small data transmission (SDT) process. The first indication information is configured to indicate whether a non small data transmission data radio bearer (non SDT DRB) on the terminal device carries uplink data to be sent.

Generally, the terminal device may send data carried on a SDT DRB directly to the network device in an idle state or an inactive state based on a resource configuration of the network device through the following methods.

The data carried on the SDT DRB is directly sent to the network device using a third access message (message3, Msg3) in a four-step random access process. The data carried on the SDT DRB is directly sent to the network device using a first access message (message A, MsgA) in a two-step random access. Alternatively, the data carried on the SDT DRB is directly sent to the network device using a dedicated physical uplink shared channel (PUSCH) resource, such as, configure grant (CG) or preallocated uplink resource (PUR), etc.

The four-step random access refers to a RRC connection established between the terminal device and the network device through four information interactions. That is, the terminal device first sends a random access preamble, such as a first access message (message 1, Msg1), to the network device. Then, the network device may reply the terminal device with a random access response, such as a second access message (message 2, Msg2). The terminal device then sends a connection establishment request, such as the third access message (message 3, Msg3), to the network device. Then, the network device returns a connection competition resolution response, such as a fourth access message (Msg4), to the terminal device.

The two-step random access refers to a RRC connection established between the terminal device and the network device through two information exchanges. That is, the terminal device first sends a random access request, such as the first access message (MsgA), to the network device, and then the network device may return an access response, such as a second access message (MsgB), to the terminal device.

Correspondingly, the SDT process may be the four-step random access process, or may be the two-step random access, or may be a process of send the data carried on the SDT DRB using the dedicated PUSCH resource, etc., which will not be limited in the present disclosure.

Alternatively, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB.

Optionally, the first identifier may be represented by a value of a specific bit, or may also be represented by a specific character, etc., which will not be limited in the present disclosure.

For example, values of first two bits in the first indication information are configured to represent the first identifier according to a protocol agreement. When the values of the first two bits are "01", it represents that there is the uplink data to be sent carried on the first non SDT DRB. When the values of the first two bits are "10", it represents that there is the uplink data to be sent carried on the second non SDT DRB. When the values of the first two bits are "00", it represents that there is no uplink data to be sent carried on the non SDT DRB. When the values of the first two bits are "11", it represents that there is the uplink data to be sent carried on both of two non SDT DRBs.

Alternatively, it may be preagreed that, in case of including "AAA", the first indication information indicates that the non SDT DRB carries the uplink data to be sent, and in case of no "AAA", indicates that the non SDT DRB does not carry the uplink data to be sent, and the like.

It should be noted that the above examples are only illustrative and cannot be used as a limitation on the first indication information, the first identifier, etc. in an embodiment of the present disclosure.

Optionally, in response to determining that the uplink data to be sent carries in the non SDT DRB, the terminal device sets a state of the non SDT DRB as a data transmission and reception state.

In response to the state of the non SDT DRB being set as the data transmission and reception state, the terminal device may read data amount of the uplink data to be sent carried in the non SDT DRB, and thus the data amount may be added into the first indication information.

It can be understood that the data amount of the uplink data to be sent carried in the non SDT DRB may be any value determined as actually required, such as 10 bytes (B), 100B, etc., which will not be limited in the present disclosure.

For example, in response to the terminal device determining that the data amount of the uplink data to be sent carried in the non SDT DRB is 10B, the second identifier added in the first indication information may be 10B.

It should be noted that the above examples are only illustrative and cannot be used as a limitation on the data amount of the uplink data, the second identification, etc., in embodiments of the present disclosure.

In addition, different non SDT DRBs may belong to a same logical channel group, or may belong to different logical channel groups, which will not be limited in the present disclosure.

Optionally, the third identifier may be represented by a value of a specific bit, or may also be represented by a specific character, etc., which will not be limited in the present disclosure.

For example, it has been preagreed that 10th to 20th bits in the first indication information represent the third identifier.

For example, a first non SDT DRB belongs to a logical channel group A, a second non SDT DRB belongs to a logical channel group B, and a third non SDT DRBA belongs to the logical channel group A. The data amount of the uplink data to be sent carried by logical channel group A is 100B, and the data amount of the uplink data to be sent carried by the logical channel group B is 20B. According to the protocol agreement, 10th to 15th bits in the first indication information correspond to data amount corresponding to the logical channel group A, and 16th to 20th bits correspond to data amount corresponding to the logical channel group B. After determining the data amount of the uplink data to be sent corresponding to the logical channel group A, the terminal device may write the data amount into the 10th to 15th bits of the first indication information. After determining the data amount of the uplink data to be sent corresponding to the logical channel group B, the terminal device may write the data amount into the 16th to 20th bits of the first indication information.

It should be noted that the above examples are only examples and cannot be used as limitations on the first indication information, the logical channel groups, the third identifier, etc. in embodiments of the present disclosure.

In addition, the first indication information may also include the identifier of the terminal device.

An identifier style or a presentation form of the terminal device may be predetermined, such as a message authentication code for integrity (MAC I), a resume message authentication code for integrity (resume MAC I), etc., which will not be limited in the present disclosure.

In addition, the identifier of the non SDT DRB may be at least one of: a DRB identifier; a logical channel identifier; and a logical channel group identifier.

An identifier style or a presentation form of the DRB may be predetermined, such as DRB3, DRB A, DRB CC, etc., which will not be limited in the present disclosure.

In addition, according to configurations of the protocol, logical channels may be divided into from 0th to 15th. logical channels 0th, 1st, and 2nd have a correspondence with the SRB, which correspond to SRB0, SRB1, and SRB2 respectively, logical channels 3rd to 10th have a correspondence with the DRB, and other logical channels 11th to 15th have reserved values.

It can be understood that a correspondence between the logical channels 3rd to 10th and the respective SDT DRB and non SDT DRB may be predetermined, such that the terminal device may, in response to determining that any non SDT DRB carries the uplink data to be sent, determine the logical channel identifier corresponding to any non SDT DRB based on the correspondence, and then add the determined logical channel identifier to the first indication information. For example, in response to determining the non SDT DRB carrying the uplink data to be sent, and determining that the non SDT DRB corresponds to the logical channel 3th, the terminal device may add the logical channel 3th into the first indication information.

It should be noted that the above examples are only illustrative and cannot be used as a limitation on the logical channel identifier, the DRB, etc. in embodiments of the present disclosure.

In addition, an identifier style or a presentation form of the logical channel group may be predetermined, such as a logical channel group A, a logical channel group 00, etc., which will not be limited in the present disclosure.

It can be understood that the correspondence between non SDT DRB and the logical channel group may be predetermined according to the protocol agreement. The terminal device may, in response to determining that any non SDT DRB carries the uplink data to be sent, determine the logical channel group identifier corresponding to any non SDT DRB based on the correspondence, and then add the determined logical channel group identifier into the first indication information. For example, in response to determining the non SDT DRB carrying the uplink data to be sent and determining that the non SDT DRB corresponds to the logical channel group A, the terminal device may add the logical channel group A into the first indication information.

It should be noted that the above examples are only illustrative and cannot be used as a limitation on the logical channel group identifier, the non SDT DRB, etc., in an embodiment of the present disclosure.

In an embodiment of the present disclosure, the terminal device may send the first instruction information to the network device as required during the SDT process, to indicate whether the non SDT DRB on terminal device carries the uplink data to be sent, which may cause the network device timely acquiring the information of the non SDT DRB on the terminal device, and with processing the uplink data, effectively avoid data loss, reduce a sending delay of data carried in the non SDT DRB as much as possible.

Figure 3:
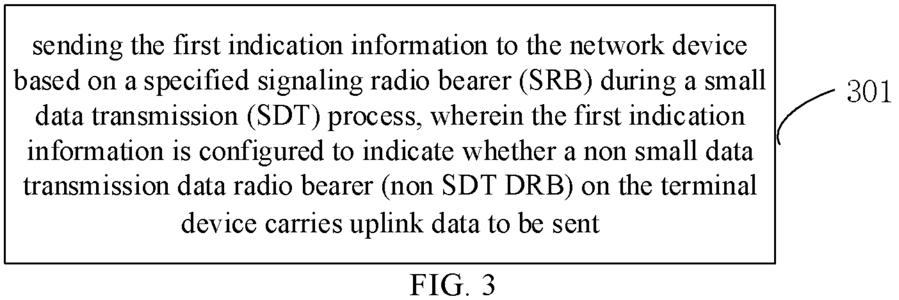
FIG. 3 is a flowchart illustrating a method for processing uplink data according to another embodiment of the present disclosure.

FIG. 3 is a flowchart illustrating a method for processing uplink data according to another embodiment of the present disclosure. The method may be performed by a terminal device. As illustrated in FIG. 3, the method may include the following step.

At step 301, first indication information is sent to a network device based on a specified SRB during the SDT process. The first indication information is configured to indicate whether a non SDT DRB on the terminal device carries uplink data to be sent.

In addition, the specified SRB may be SRB0 or SRB1.

Generally, the SRB0 may be configured to send a RRC message for a common control channel (CCCH) logical channel. The SRB1 may be configured to send the RRC message for a dedicated control channel (DCCH) logical channel. The RRC message may carry an NAS message or be configured to send the NAS message before the SRB2 is established, and the like.

Optionally, the first indication information may be represented by specified bits in the specified SRB according to a protocol agreement or a network configuration.

Optionally, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB. The identifier of the non SDT DRB may include at least one of: a DRB identifier; a logical channel identifier; and a logical channel group identifier.

Styles and implementation forms of the above identifiers may be referred to other embodiments of the present disclosure, which will not be repeated here.

Optionally, the terminal device has been sent identifier information of the terminal device to the network device through the common control channel (CCCH), and further deletes the identifier information of the terminal device from packet data convergence protocol PDCP data in the SRB1.

Generally, the identifier of the terminal device is carried at the end of the PDCP data of SRB1 by default according to the protocol agreement. In the present disclosure, it is considered that during the SDT process, the terminal device has already sent the identifier information of the terminal device to the network device when sending the information to the network device through the CCCH. Thus, the identifier information of the terminal device in the PDCP data in the SRB1 may be deleted to avoid duplicate sending of the identifier of the terminal device, effectively reduce the sending amount of the uplink data, and improve a processing efficiency.

Optionally, during communication with the network device, the terminal device may trigger a buffer status report (BSR) after generating the RRC signaling of the SRB. In the present disclosure, in order to avoid duplicate sending of data, it may set not triggering the BSR through the specified SRB during the SDT process. Thus, during the SDT process, when the terminal device sends the first instruction information to the network device through the specified SRB, the RRC signaling of the specified SRB may not trigger the BSR, that is, the first instruction message may not be reported again through the BSR, effectively avoiding duplicate sending of data, reducing redundancy, and improving an efficiency.

Correspondingly, in order to avoid data loss and ensure smooth progress of the communication process, the present disclosure may trigger the BSR through the specified SRB after the SDT process ends, such that the data sent by the terminal to the network device through the specified SRB may also be reported again through the BSR.

Optionally, during the SDT process, in order to ensure that the terminal device may send the first instruction information to the network device timely, a priority of sending the specified SRB may be set to be higher than a priority of sending the BSR. Thus, it may be ensured that, in case of limited uplink resources, the first instruction information may be sent to the network device first, to avoid loss of data carried in the non SDT DRB as much as possible.

Correspondingly, in response to the priority of sending the BSR specified in the protocol is generally higher than the priority of sending the SRB, the priority of sending the specified SRB is set to be higher than the priority of sending the BSR during the SDT process, in order to ensure that the data carried in the non SDT DRB may be sent to the network device timely. After the SDT process ends, the priority of sending the specified SRB may be restored to a normal state specified in the protocol, that is, the priority of sending the specified SRB is set to be lower than the priority of sending the BSR after the SDT process ends.

In embodiments of the present disclosure, the terminal device may send the first instruction information to the network device based on the specified wireless signaling carrying SRB as required during the small data transmission SDT process, and the first instruction information indicates whether the non SDT DRB on the terminal device carries the uplink data to be sent, which may cause the network device timely acquiring the information of the non SDT DRB on the terminal device, and with processing the uplink data, effectively avoid data loss, reduce a sending delay of data carried on the non SDT DRB as much as possible.

Figure 4:
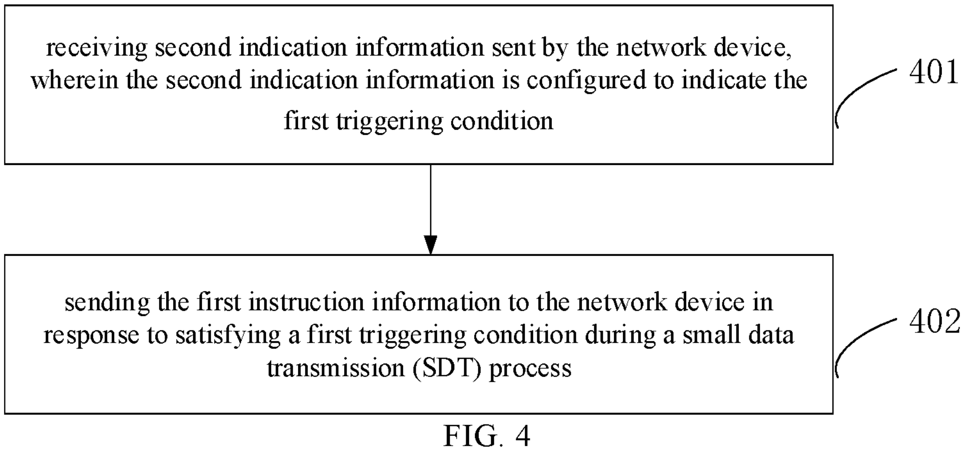
FIG. 4 is a flowchart illustrating a method for processing uplink data according to another embodiment of the present disclosure.

FIG. 4 is a flowchart illustrating a method for processing uplink data according to another embodiment of the present disclosure. The method may be performed by a terminal device. As illustrated in FIG. 4, the method may include the following steps.

At step 401, second indication information sent by the network device is received. The second indication information is configured to indicate the first triggering condition.

At step 402, during the SDT process, the first instruction information is sent to the network device in response to satisfying a first triggering condition.

The first indication information is configured to indicate whether a non SDT DRB on the terminal device carries uplink data to be sent.

Optionally, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB. The identifier of the non SDT DRB may include at least one of: a DRB identifier; a logical channel identifier; and a logical channel group identifier.

Styles and implementation forms of the above identifiers may be referred to other embodiments of the present disclosure, which will not be repeated here.

Optionally, the first triggering condition may include any one of: an amount of the uplink data to be sent in the non SDT DRB being greater than or equal to a first threshold value; an amount of the uplink data to be sent in the non SDT DRB being less than or equal to a second threshold value; the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated physical uplink shared channel (PUSCH); and the terminal device not generating a medium access control layer (MAC) protocol data unit (PDU) corresponding to data carried by an SDT DRB.

The first threshold value and the second threshold value may be determined by the terminal device according to a protocol agreement, or may also be configured for the terminal device by the network device, which will not be limited in the present disclosure.

Alternatively, the first triggering condition is the amount of the uplink data to be sent in the non SDT DRB being greater than or equal to the first threshold value, and the terminal device may send the first indication information to the network device when the first triggering condition is satisfied. Thus, it may ensure data sending of large amounts of data first and delaying sending of small amounts of data.

Alternatively, the first triggering condition is the amount of the uplink data to be sent in the non SDT DRB being less than or equal to the second threshold value, and the terminal device may send the first indication information to the network device only when the non SDT DRB carries a small amount of data, which may avoid data accumulation and reduce network congestion.

Alternatively, the first triggering condition is the terminal device not sending the first access message (message 1, Msg1) in the four-step random access. At this point, the terminal device has not yet started the four-step random access process, that is, has not yet sent SDT data, and sending the first instruction information to the network device may not affect sending and transmitting of the SDT data.

Alternatively, the first triggering condition is the terminal device not sending a third access message (message 3, Msg3) in the four-step random access. It can be understood that terminal devices may directly send the data carried on the SDT DRB to the network device using the third access message (message 3, Msg3) in the four-step random access. At this point, the terminal device has not yet sent the third access message (message 3, Msg3) in the four-step random access, that is, has not yet sent the SDT data, and sending the first instruction information to the network device may not affect sending and transmitting of the SDT data.

Alternatively, the first triggering condition is the terminal device not sending a first access message (message A, MsgA) in a two-step random access. It can be understood that the terminal device may directly send the data carried on the SDT DRB to the network device using the first access message (message A, MsgA) in the two-step random access. At this point, the terminal device has not yet sent the first access message (message A, MsgA) in the two-step random access, that is, has not yet sent the SDT data, and sending the first instruction information to the network device may not affect sending and transmitting of the SDT data.

Alternatively, the first triggering condition is the terminal device not sending SDT data through a dedicated physical uplink shared channel (PUSCH). It can be understood that terminal devices can utilize a PUSCH resource, such as a CG, a PUR, etc. At this point, the terminal device has not yet sent the SDT data, and sending the first indication information to the network device may not affect sending and transmitting of the SDT data.

Alternatively, the first triggering condition is the terminal device not generating the MAC PDU corresponding to the data carried by the SDT DRB. It can be understood that the terminal device has generated the MAC PDU corresponding to the data carried by the SDT DRB, namely has completed a preparation work for transmitting the SDT data. At this time, in response to sending the first instruction information, it may cause the generated MAC PDU invalid and resource waste. In response to the terminal device not generating the MAC PDU corresponding to the data carried by the SDT DRB, sending the first indication information to the network device may not cause resource waste.

In an embodiment of the present disclosure, the terminal device may first receive the second instruction information sent by the network device, and then send the first instruction information to the network device in response to satisfying the first triggering condition, which may not only ensure reliable transmission of the data carried on the SDT DRB, but also avoid loss of the data carried on the non SDT DRB.

Figure 5:
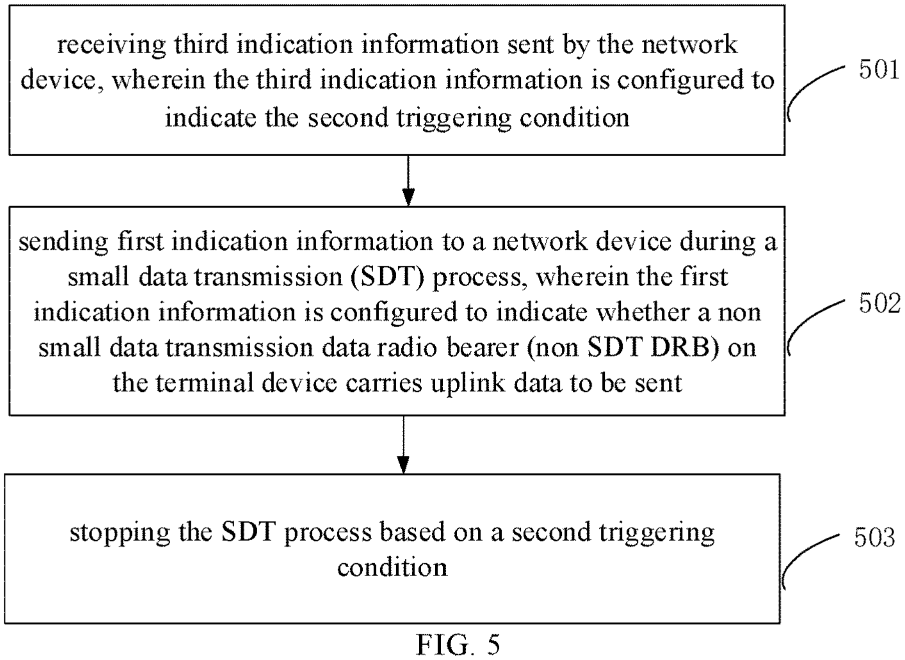
FIG. 5 is a flowchart illustrating a method for processing uplink data according to another embodiment of the present disclosure.

FIG. 5 is a flowchart illustrating a method for processing uplink data according to another embodiment of the present disclosure. The method may be performed by a terminal device. As illustrated in FIG. 5, the method may include the following steps.

At step 501, third indication information sent by the network device is received. The third indication information is configured to indicate the second triggering condition.

Optionally, the second triggering condition may include any one of: the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated PUSCH; and a priority of sending data carried by the non SDT DRB being higher than a priority of sending data carried by an SDT DRB.

The specific meanings of the four-step random access, the two-step random access, and each access message can refer to the detailed description in other embodiments of the present disclosure, which will not be repeated here.

At step 502, during the SDT process, the first instruction information is sent to the network device. The first indication information is configured to indicate whether a non small data transmission data radio bearer (non SDT DRB) on the terminal device carries uplink data to be sent.

Optionally, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB. The identifier of the non SDT DRB may include at least one of: a DRB identifier; a logical channel identifier; and a logical channel group identifier.

Styles and implementation forms of the above identifiers may be referred to other embodiments of the present disclosure, which will not be repeated here.

In the present disclosure, steps 501 and 502 can be executed in parallel, or step 501 can be executed first and then step 502 is executed, or step 502 can be executed first and then step 501 is executed, which will not be limited in the present disclosure.

At step 503, the SDT process stops based on a second triggering condition.

For example, the second triggering condition is the terminal device not sending a first access message (message 1, Msg1) in a four-step random access. At this point, the terminal device has not yet started the four-step random access process, that is, has not yet sent SDT data, and stopping the SDT process may not affect sending and transmitting of the SDT data.

It can be understood that the second triggering condition for stopping the SDT process set in the present disclosure may cause the terminal device to stop the SDT process before completing sending of the SDT data, so as to process the data carried on the non SDT DRB timely, which may not affect sending and transmitting of the SDT data, and ensure a priority of sending the data carried on the non SDT DRB higher than a priority of sending the data carried on the SDT DRB.

Optionally, in the present disclosure, the network device may also send instruction information to the terminal device after receiving the first instruction information sent by the terminal device to instruct the terminal device to stop the SDT process. After receiving this instruction, the terminal device may directly stop the SDT process.

In an embodiment of the present disclosure, the terminal device may first receive the third indication information sent by the network device, and then send the first indication information to the network device during the SDT process. The SDT process is stopped in response to satisfying the second triggering condition, which may not affect sending and transmitting of the SDT data, and ensure the priority of sending the data carried on the non SDT DRB higher than the priority of sending the data carried on the SDT DRB.

Figure 6:
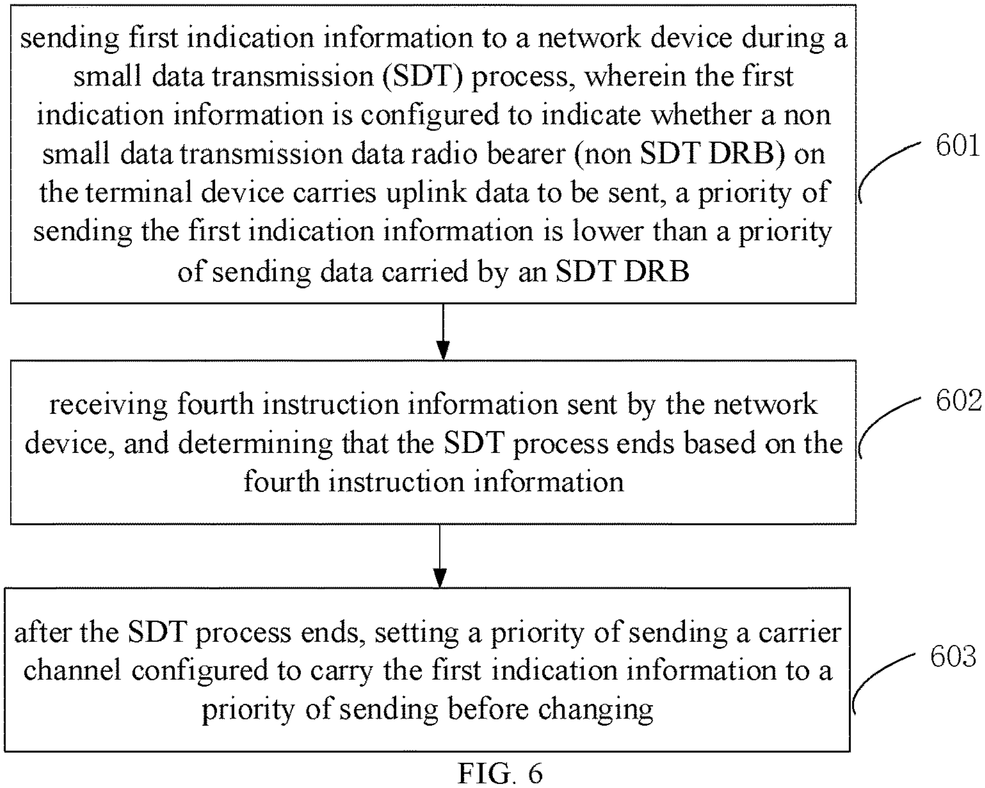
FIG. 6 is a flowchart illustrating a method for processing uplink data according to another embodiment of the present disclosure.

FIG. 6 is a flowchart illustrating a method for processing uplink data according to another embodiment of the present disclosure. The method may be performed by a terminal device. As illustrated in FIG. 6, the method may include the following steps.

At step 601, first indication information is sent to a network device during a SDT process. The first indication information is configured to indicate whether a non small data transmission data radio bearer (non SDT DRB) on the terminal device carries uplink data to be sent, and a priority of sending the first indication information is lower than a priority of sending data carried by an SDT DRB.

Optionally, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB. The identifier of the non SDT DRB may include at least one of: a DRB identifier; a logical channel identifier; and a logical channel group identifier.

Styles and implementation forms of the above identifiers may be referred to other embodiments of the present disclosure, which will not be repeated here.

Optionally, in this disclosure, in order to ensure reliable sending of SDT data, the terminal device may set a priority of sending the first indication information to be lower than a priority of sending data carried by an SDT DRB before, during, or after the SDT process is started, to ensure that the data carried by the SDT DRB is sent first and then the first indication information is sent, which may avoid data confusion and loss.

Optionally, the method may also set a priority of sending data carried by the non SDT DRB to be lower than a priority of sending data carried by the SDT DRB, to ensure that the data carried by the SDT DRB priority is sent first, and the data carried by the non SDT DRB is then sent, which effectively avoid data confusion and loss.

At step 602, fourth instruction information sent by the network device is received, and it is determined that the SDT process ends based on the fourth instruction information.

The fourth indicator information may include any one of: a fourth access message Msg4 in a four-step random access; a second access message MsgB in a two-step random access; and cell-radio network temporary identifier (C-RNTI).

Alternatively, the terminal device receives the fourth access message (message4, Msg4) in the four-step random access sent by the network device. It can be understood that the terminal device may send the SDT data to the network device through the third access message (message3, Msg3) of the four-step random access. The terminal device has received the fourth access message (message4, Msg4) in the four-step random access sent by the network device, indicating that the SDT process has ended.

Alternatively, the terminal device receives the second access message (message B, MsgB) in the two-step random access sent by the network device. It can be understood that the terminal device may send the SDT data to the network device through the first access message (message A, MsgA) of the two-step random access. The terminal device has received the second access message (message B, MsgB) in the two-step random access sent by the network device, indicating that the SDT process has ended.

Alternatively, the terminal device receives the cell-radio network temporary identifier (C-RNTI) sent by the network device. For the SDT process using a dedicated PUSCH resource, the terminal device receives a confirmation message C-RNTI from the network device, indicating that the SDT process has ended.

Optionally, it is also determined that a specified SDT sending number is reached, and determined that the SDT process ends.

The specified SDT sending number may be determined by the terminal device according to a protocol agreement, or may also be configured for the terminal device by the network device, which will not be limited in the present disclosure.

Optionally, it is also determined that a specified SDT sending duration is reached, and determined that the SDT process ends.

The specified SDT sending duration may be determined by the terminal device according to the protocol agreement, or may also be configured for the terminal device by the network device, which will not be limited in the present disclosure.

At step 603, after the SDT process ends, a priority of sending a carrier channel configured to carry the first indication information is set to a priority of sending before changing.

During the SDT process, the priority of sending the first indication information may be set to be lower than the priority of sending the data carried by the SDT DRB in order to ensure that the data carried on the SDT DRB is not affected and can be sent smoothly. After the SDT process ends, the terminal device may set the priority of sending the carrier channel configured to carry the first indication information to the priority of sending before changing, which may ensure that the terminal device can communicate reliably with the network device according to the protocol agreement.

Similarly, the method may, after the SDT process ends, set a priority of sending data carried by the non SDT DRB to a priority of sending before changing.

In an embodiment of the present disclosure, during the SDT process, in case of determining that the non SDT DRB carries the uplink data to be sent, the terminal device may send the first indication information to the network device, and the priority of sending the first indication information is set to be lower than the priority of sending the data carried on the SDT DRB. After receiving the fourth indication information sent by the network device, the priority of sending the carrier channel configured to carry the first indication information is set to the priority of sending before changing, which not only ensures reliable and timely sending of the data carried on the SDT DRB, but also ensures that the terminal device can continue to use channel resources in an order of priorities before changing after completing sending of the data carried on the SDT DRB.

Figure 7:
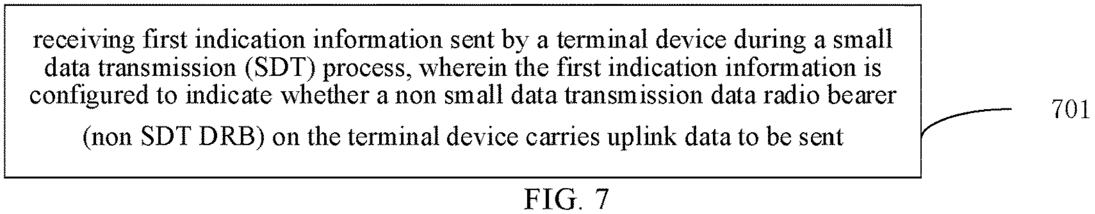
FIG. 7 is a flowchart illustrating a method for processing uplink data according to another embodiment of the present disclosure.

FIG. 7 is a flowchart illustrating a method for processing uplink data according to another embodiment of the present disclosure. The method may be performed by a network device. As illustrated in FIG. 7, the method may include the following step.

At step 701, first indication information sent by a terminal device is received. The first indication information is configured to indicate whether a non small data transmission data radio bearer (non SDT DRB) on the terminal device carries uplink data to be sent.

Optionally, the first indication information may include at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB. The identifier of the non SDT DRB may include at least one of: a DRB identifier; a logical channel identifier; and a logical channel group identifier.

Styles and implementation forms of the above identifiers may be referred to other embodiments of the present disclosure, which will not be repeated here.

Optionally, in response to determining that the non SDT DRB on the terminal device carries the uplink data to be sent based on the first indication information, the network device may determine to restore a RRC connection with the terminal device. in response to determining that the non SDT DRB on the terminal device does not carry the uplink data to be sent based on the first indication information, the network device may determine not to restore the RRC connection with the terminal device.

In an embodiment of the present disclosure, the network device may determine whether the non SDT DRB on the terminal device carries the uplink data to be sent based on the first instruction information received from the terminal device, which may timely acquire information of the non SDT DRB on the terminal device side, and with processing the uplink data, effectively avoid data loss, reduce a sending delay of data carried on the non SDT DRB as much as possible.

Figure 8:
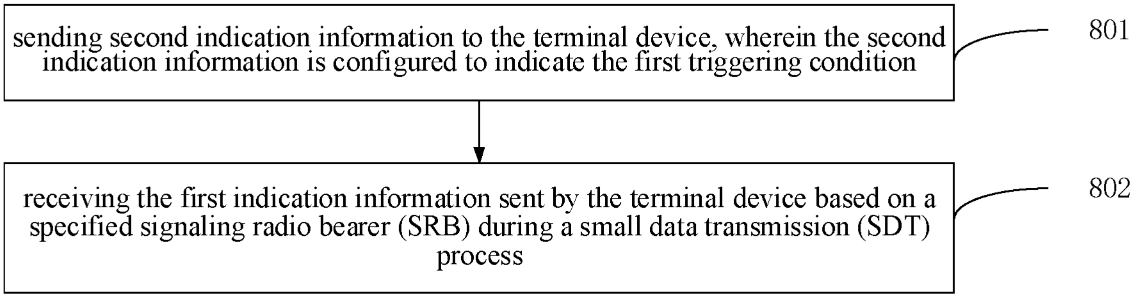
FIG. 8 is a flowchart illustrating a method for processing uplink data according to another embodiment of the present disclosure.

FIG. 8 is a flowchart illustrating a method for processing uplink data according to another embodiment of the present disclosure. The method may be performed by a network device. As illustrated in FIG. 8, the method may include the following steps.

At step 801, second indication information is sent to the terminal device. The second indication information is configured to indicate the first triggering condition.

Contents and implementation forms in the first indication information and the second indication information can be referred to in other embodiments of the present disclosure, which will not be repeated here.

Optionally, the first triggering condition may include any one of: an amount of the uplink data to be sent in the non SDT DRB being greater than or equal to a first threshold value; an amount of the uplink data to be sent in the non SDT DRB being less than or equal to a second threshold value; the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated physical uplink shared channel (PUSCH); and the terminal device not generating a medium access control layer (MAC) protocol data unit (PDU) corresponding to data carried by an SDT DRB.

The effect corresponding to each triggering condition in the disclosure and an operation performed by the terminal device based on each triggering condition can be referred to other embodiments of the disclosure, which will not be repeated here.

Optionally, the network device may further send third indication information to the terminal device. The third indication information is configured to indicate the second triggering condition.

Optionally, the second triggering condition may include any one of: the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated PUSCH; and a priority of sending data carried by the non SDT DRB being higher than a priority of sending data carried by an SDT DRB.

The effect corresponding to each triggering condition in the disclosure and operations performed by the terminal device based on different triggering conditions can be referred to other embodiments of the disclosure, which will not be repeated here.

At step 802, during a SDT process, the first indication information sent by the terminal device is received based on a specified signaling radio bearer (SRB).

The first indication information is configured to indicate whether a non SDT DRB on the terminal device carries uplink data to be sent. The specified SRB is SRB0 or SRB1.

Optionally, the first indication information can be represented using a specified bit in the specified SRB according to a protocol agreement or a network configuration.

During the SDT process, the terminal device sends the relevant content and implementation method of the first instruction information based on the specified SRB, which can be referred to in other embodiments of the present disclosure, and will not be repeated here.

In an embodiment of the present disclosure, the network device may send the second indication information to the terminal device, and then wirelessly carry the SRB based on the specified signaling to receive the first indication information sent by the terminal device, which may timely acquire information of the non SDT DRB on the terminal device side, and with processing the uplink data, effectively avoid data loss, reduce a sending delay of data carried on the non SDT DRB as much as possible.

In embodiments provided in the present disclosure, the method proposed in the present disclosure is introduced from perspectives of the network device and the terminal device. In order to achieve functions of the method proposed in embodiments of the present disclosure, the network device and the terminal device may include hardware structures and software modules, to achieve the above functions in form of hardware structures, software modules, or a combination of hardware structures and software modules. One of the above functions can be executed in the form of hardware structures, software modules, or the combination of hardware structures and software modules.

Figure 9:
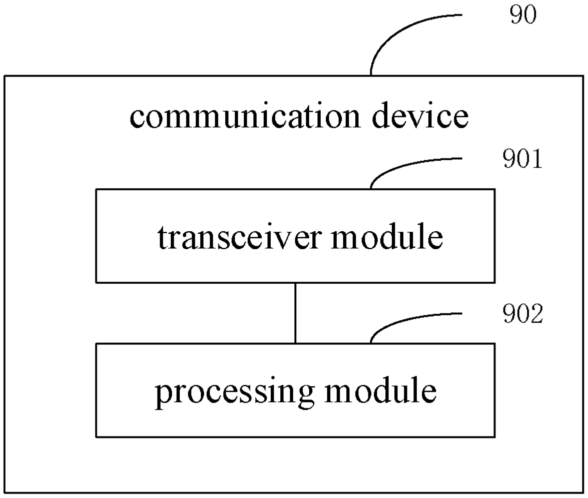
FIG. 9 is a block diagram illustrating a communication device according to an embodiment of the present disclosure.

FIG. 9 is a block diagram illustrating a communication device according to an embodiment of the present disclosure. As illustrated in FIG. 9, the communication device 90 may include a transceiver module 901.

The transceiver module 901 may include a sending module and/or a receiving module. The sending module is configured for implementing a sending function, and the receiving module is configured for implementing a receiving function. The transceiver module 901 may implement the sending function and/or the receiving function.

The transceiver module 901 is configured to send first indication information to a network device during a small data transmission (SDT) process. The first indication information is configured to indicate whether a non small data transmission data radio bearer (non SDT DRB) on a terminal device carries uplink data to be sent.

Optionally, the transceiver module 901 is configured to: send the first indication information to the network device based on a specified signaling radio bearer (SRB).

Optionally, the specified SRB is SRB0 or SRB1.

Optionally, the transceiver module 901 is configured to send identifier information of the terminal device to the network device through a common control channel (CCCH).

Optionally, the device 90 further comprises:

a processing module 902, configured to delete the identifier information of the terminal device from packet data convergence protocol PDCP data in the specified SRB, in which, the specified SRB is SRB1.

Optionally, the processing module 902 is configured to cause the transceiver module not triggering a buffer status report (BSR) through the specified SRB during the SDT process; or set a priority of sending the specified SRB to be higher than a priority of sending the BSR during the SDT process.

Optionally, the processing module 902 is configured to trigger the BSR through the specified SRB after ending the SDT process; or set the priority of sending the specified SRB to be lower than the priority of sending the BSR after the SDT process ends.

Optionally, the first indication information includes at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB.

Optionally, the identifier of the non SDT DRB comprises at least one of: a DRB identifier; a logical channel identifier; and a logical channel group identifier.

Optionally, the transceiver module 901 is configured to send the first instruction information to the network device in response to satisfying a first triggering condition.

Optionally, the first triggering condition includes any one of: an amount of the uplink data to be sent in the non SDT DRB being greater than or equal to a first threshold value; an amount of the uplink data to be sent in the non SDT DRB being less than or equal to a second threshold value; the terminal device not sending a first access message Msg1 in a four-step random access; the terminal device not sending a third access message Msg3 in the four-step random access; the terminal device not sending a first access message MsgA in a two-step random access; the terminal device not sending SDT data through a dedicated physical uplink shared channel (PUSCH); and the terminal device not generating a medium access control layer (MAC) protocol data unit (PDU) corresponding to data carried by an SDT DRB.

Optionally, the transceiver module 901 is configured to: receive second indication information sent by the network device, in which, the second indication information is configured to indicate the first triggering condition.

Optionally, the processing module 902 is configured to stop the SDT process.

Optionally, the processing module 902 is configured to: stop the SDT process based on a second triggering condition.

Optionally, the second triggering condition includes any one of: the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated PUSCH; and a priority of sending data carried by the non SDT DRB being higher than a priority of sending data carried by an SDT DRB.

Optionally, the transceiver module 901 is configured to: receive third indication information sent by the network device, in which, the third indication information is configured to indicate the second triggering condition.

Optionally, the processing module 902 is configured to: set a priority of sending the first indication information to be lower than a priority of sending data carried by an SDT DRB; or, set a priority of sending data carried by the non SDT DRB to be lower than a priority of sending data carried by the SDT DRB.

Optionally, the transceiver module 901 is configured to receive fourth instruction information sent by the network device, and determining that the SDT process ends based on the fourth instruction information; or, the processing module 902 is configured to determine that a specified SDT sending number is reached, and determining that the SDT process ends; or, the processing module 902 is configured to determine that a specified SDT sending duration is reached, and determining that the SDT process ends.

Optionally, the third indicator information includes any one of: a fourth access message (message 4, Msg4) in a four-step random access; a second access message (message B, MsgB) in a two-step random access; and cell-radio network temporary identifier (C-RNTI).

Optionally, the processing module 902 is configured to: after the SDT process ends, set a priority of sending a carrier channel configured to carry the first indication information to a priority of sending before changing; or after the SDT process ends, set a priority of sending data carried by the non SDT DRB to a priority of sending before changing.

Optionally, the processing module 902 is configured to: set a state of the non SDT DRB to a data transmission and reception state when the non SDT DRB carries the uplink data to be sent.

The communication device 90 may be a terminal device (such as the terminal device in the aforementioned method embodiment), or a device in the terminal device, or a device that can be matched and used with the terminal device.

In the communication device provided in the present disclosure, the terminal device may send the first instruction information to the network device as required during the SDT process, to indicate whether the non SDT DRB on terminal device carries the uplink data to be sent, which may cause the network device timely acquiring the information of the non SDT DRB on the terminal device, and with processing the uplink data, effectively avoid data loss, reduce a sending delay of data carried in the non SDT DRB as much as possible.

Figure 10:
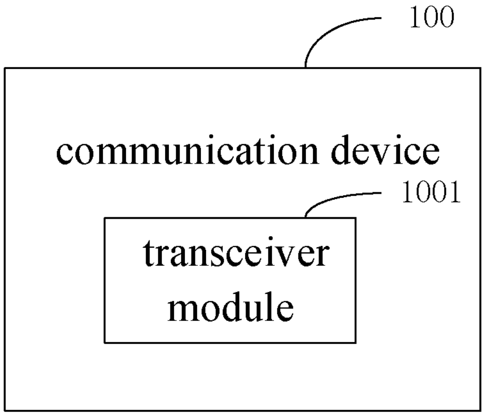
FIG. 10 is a block diagram illustrating a communication device according to another embodiment of the present disclosure.

FIG. 10 is a block diagram illustrating a communication device according to an embodiment of the present disclosure. As illustrated in FIG. 10, the communication device 100 may include a transceiver module 1001.

The transceiver module 1001 may include a sending module and/or a receiving module. The sending module is configured for implementing a sending function, and the receiving module is configured for implementing a receiving function. The transceiver module 1001 may implement the sending function and/or the receiving function.

The transceiver module 1001 is configured to receive first indication information sent by a terminal device during a small data transmission (SDT) process. The first indication information is configured to indicate whether a non small data transmission data radio bearer (non SDT DRB) on the terminal device carries uplink data to be sent.

Optionally, the transceiver module 1001 is configured to receive the first indication information sent by the terminal device based on a specified signaling radio bearer (SRB).

Optionally, the specified SRB is SRB0 or SRB1.

Optionally, the first indication information includes at least one of: a first identifier for indicating whether the non SDT DRB carries the uplink data to be sent; a second identifier for indicating data amount of the uplink data to be sent carried in the non SDT DRB; a third identifier for indicating data amount of the uplink data to be sent carried in a logical channel group to which the non SDT DRB belongs; an identifier of the terminal device; and an identifier of the non SDT DRB.

Optionally, the identifier of the non SDT DRB includes at least one of: a DRB identifier; a logical channel identifier; and a logical channel group identifier.

Optionally, the transceiver module 1001 is configured to: send second indication information to the terminal device, wherein the second indication information is configured to indicate the first triggering condition.

Optionally, the first triggering condition comprises any one of: an amount of the uplink data to be sent in the non SDT DRB being greater than or equal to a first threshold value; an amount of the uplink data to be sent in the non SDT DRB being less than or equal to a second threshold value; the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated physical uplink shared channel (PUSCH); and the terminal device not generating a medium access control layer (MAC) protocol data unit (PDU) corresponding to data carried by an SDT DRB.

Optionally, the transceiver module is configured to: send third indication information to the terminal device, wherein the third indication information is configured to indicate the second triggering condition.

Optionally, the second triggering condition includes any one of: the terminal device not sending a first access message (message 1, Msg1) in a four-step random access; the terminal device not sending a third access message (message 3, Msg3) in the four-step random access; the terminal device not sending a first access message (message A, MsgA) in a two-step random access; the terminal device not sending SDT data through a dedicated PUSCH; and a priority of sending data carried by the non SDT DRB being higher than a priority of sending data carried by an SDT DRB.

The communication device 100 may be a network device, or a device in a network device, or a device that can be matched and used with a network device.

In the communication device provided in the present disclosure, the network device may determine whether the non SDT DRB on the terminal device carries the uplink data to be sent based on the first instruction information received from the terminal device, which may timely acquire information of the non SDT DRB on the terminal device side, and with processing the uplink data, effectively avoid data loss, reduce a sending delay of data carried on the non SDT DRB as much as possible.

Figure 11:
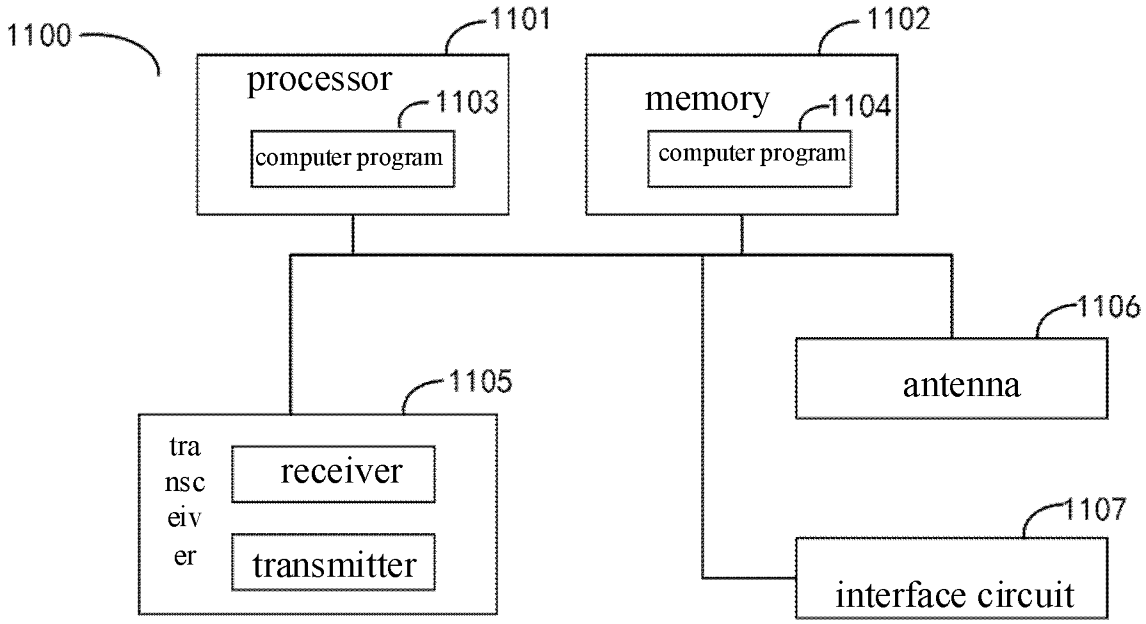
FIG. 11 is a block diagram illustrating a communication device according to another embodiment of the present disclosure.

FIG. 11 is a block diagram illustrating a communication device 1100 provided in another embodiment of the present disclosure. The communication device 1100 may be a network device, or a terminal device, or a chip, a chip system, or a processor that supports the network device to implement the above method, or a chip, a chip system, or a processor that supports the terminal device to implement the above method. This device may be configured to implement the method as described in the above method embodiments, the details of which may refer to illustration of the above method embodiments.

The communication device 1100 may include one or more processors 1101. The processor 1101 may be a general-purpose processor, a dedicated processor, or the like. For example, the processor 1101 may be a baseband processor or a central processing unit. The baseband processor may be configured to process a communication protocol and communication data, while the central processor may be configured to control the communication devices (such as a base station, a baseband chip, a terminal device, a terminal chip, a DU or a CU, etc.), execute a computer program, and process data from computer program.

Optionally, the communication device 1100 may further include one or more memories 1102, each with a computer program 1104 stored thereon. The processor 1101 may execute the computer program 1104 to enable the communication device 1100 to execute the method as described in the above method embodiments. Optionally, the memory 1102 may further store data. The communication device 1100 and the memory 1102 may be set separately or integrated together.

Optionally, the communication device 1100 may further include a transceiver 1105 and an antenna 1106. The transceiver 1105 may be referred to as a transceiver unit, transceiver, or transceiver circuit, etc., configured to achieve a transceiver function. The transceiver 1105 may include a receiver and a transmitter, and the receiver may be referred to as a receiver or a reception circuit, etc., configured to achieve a reception function; the transmitters may be referred to as a transmitter or a transmission circuit, etc., configured to achieve a transmission function.

Optionally, the communication device 1100 may also include one or more interface circuits 1107. The interface circuit 1107 is configured to receive code instructions and transmit the code instructions to the processor 1101. The processor 1101 runs the code instructions causing the communication device 1100 to execute the method as described in the above method embodiment.

The communication device 1100 is a terminal device. The processor 1101 is configured to execute the step 503 in FIG. 5, the step 603 in FIG. 6, and the like. The transceiver 1105 is configured to perform the step 201 in FIG. 2, the step 301 in FIG. 3, the step 401 in FIG. 4, the step 402 in FIG. 4, the step 501 in FIG. 5, the step 502 in FIG. 5, the step 601 in FIG. 6, and the step 602 in FIG. 6, and the like.

The communication device 1100 is a network device. The transceiver 1105 is configured to execute the step 701 in FIG. 7, the step 801 in FIG. 8, the step 802 in FIG. 8, and the like.

In an implementation, processor 1101 may include a transceiver for implementing reception and transmission functions. For example, the transceiver may be a transceiver circuit, an interface, or an interface circuit. The transceiver circuit, the interface, or the interface circuit for achieving the reception and transmission functions may be separate or integrated together. The above-mentioned transceiver circuit, interface or interface circuit may be configured for reading and writing codes/data, or the aforementioned transceiver circuit, interface or interface circuit may be configured for transmitting or transferring of signals.

In an implementation, the processor 1101 may store a computer program 1103. The computer program 1103 may cause communication device 1100 to execute the method described in the above method embodiment when running on the processor 1101. The computer program 1103 may be embedded in the processor 1101, in which case the processor 1101 may be implemented by hardware.

In an implementation, the communication device 1100 may include a circuit that may achieve functions of sending, receiving, or communicating in the aforementioned method embodiments. The processor and the transceiver described in the present disclosure may be implemented on an integrated circuit (IC), an analog IC, a radio frequency integrated circuit (RFIC), a mixed signal IC, an application specific integrated circuits (ASIC), a printed circuit boards (PCB), an electronic device, and the like. The processor and the transceiver may also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (such as the first terminal device in the aforementioned method embodiment), but the scope of the communication device described in the present disclosure is not limited to this, and the structure of the communication device may not be limited by FIG. 11. The communication device can be an independent device or can be part of a larger device. For example, the communication device may be:

(1) an independent integrated circuit IC, or a chip, or a chip system or subsystem;

(2) a set of one or more ICs, optionally including a storage element for storing data and the computer program;

(3) an ASIC, such as a modem;

(4) modules that can be embedded in other devices;

(5) a receiver, a terminal, a smart terminal, a cellular phone, a wireless device, a handheld device, a mobile unit, an on-board device, a network device, a cloud device, an artificial intelligence device, etc.;

(6) others and the like.

Figure 12:
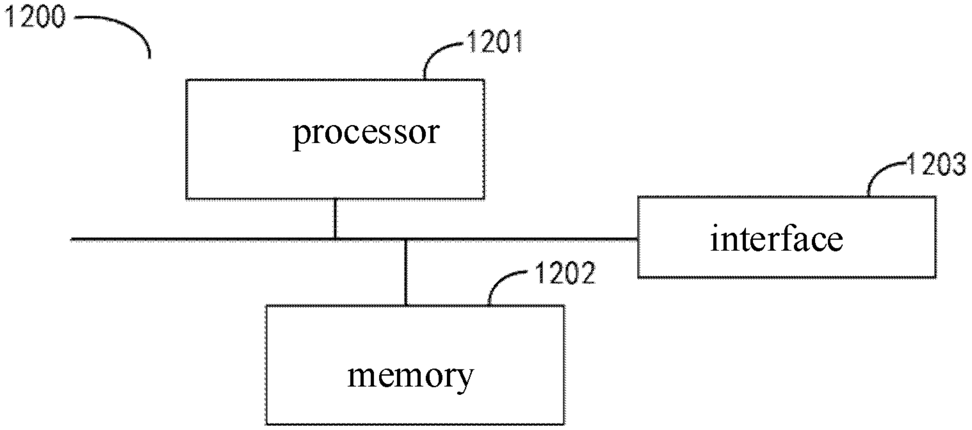
FIG. 12 is a block diagram illustrating a chip according to an embodiment of the present disclosure.

For a case that the communication device is the chip or the chip system, please refer to a schematic diagram of a structure of the chip shown in FIG. 12. The chip 1200 shown in FIG. 12 includes a processor 1201 and an interface 1203. A number of processors 1201 may be one or more, and a number of interfaces 1203 may be multiple.

For a case where the chip is configured to implement functions of the terminal device in embodiments of the present disclosure:

the interface 1203 is configured to execute the step 201 in FIG. 2, the step 301 in FIG. 3, the step 401 in FIG. 4, the step 402 in FIG. 4, the step 501 in FIG. 5, the step 502 in FIG. 5, the step 601 in FIG. 6, and the step 602 in FIG. 6, and the like.

For a case where the chip is configured to implement functions of the network device in embodiments of the present disclosure:

the interface 1203 is configured to execute the step 701 in FIG. 7, the step 801 in FIG. 8, the step 802 in FIG. 8, and the like.

Optionally, the chip may further include a memory 1202, configured to store a necessary computer program and data.

Those skilled in the art may also understand that various illustrative logical blocks and steps listed in embodiments of the present disclosure can be implemented through electronic hardware, computer software, or a combination thereof. Whether such functions are implemented through hardware or software depends on a specific application and design requirements of an overall system. Those skilled in the art may use various methods to implement functions for each specific application, but such implementation should not be understood as beyond the scope of protection of embodiments of the present disclosure.

The present disclosed embodiment also provides a system for processing uplink data, which includes the communication device in the aforementioned embodiment of FIG. 9, the communication device in the aforementioned embodiment of FIG. 10, or the communication device as the terminal device and the communication device as the network device in the aforementioned embodiment of FIG. 11.

The present disclosure also provides a readable storage medium with instructions stored thereon, the instructions is configured to implement functions of any of the above method embodiments when executed by a computer.

The present disclosure also provides a computer program product, configured to implement functions of any of the above method embodiments when executed by a computer.

All or part of the above embodiments can be implemented through software, hardware, firmware, or any combination thereof. When implemented using the software, all or part of the above embodiments can be implemented in the form of computer program product. The computer program product includes one or more computer programs. When loading and executing the computer programs on a computer, the computer programs may be generated all or part of processes or functions according to embodiments of the present disclosure. The computer can be a general-purpose computer, a specialized computer, a computer network, or other programmable devices. The computer programs can be stored on a computer-readable storage media or transmitted from one computer readable storage medium to another, for example, the computer programs can be transmitted from a website site, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server including one or more available media integrations or a data center. The available media can be a magnetic media (such as a floppy disk, a hard drive, a magnetic tape), an optical media (such as a high-density digital video disc (DVD)), or a semiconductor media (such as a solid state disk (SSD)), etc.

Those ordinary skilled in the art may understand that first, second, and other numerical numbers involved in the disclosure are distinguished only for convenience of description, and are not intended to limit the scope of embodiments of the present disclosure, nor indicate an order.

At least one in this disclosure can also be described as one or more, and a plurality can be two, three, four, or more, without limitation in this disclosure. In embodiments of the present disclosure, for one type of technical feature, technical features in the type of technical feature are distinguished by “first”, “second”, “third”, “A”, “B”, “C”, and “D”. The technical features described by “first”, “second”, “third”, “A”, “B”, “C”, and “D” are without any order or sequence.

The term predetermined in this disclosure can be understood as defined, predefined, stored, prestored, prenegotiated, preconfigured, cured, or prefired.

Those ordinary skilled in the art can realize that a units and an algorithm step of each example described in combination with embodiments in the present disclosure can be implemented in electronic hardware, or a combination of computer software and the electronic hardware. Whether such functions are executed in hardware or software depends on specific applications and design constraints of the technical solution. Those skilled may use different methods to implement the described functions for each specific application, but such implementation should not be considered beyond the scope of this disclosure.

Those skilled in the art can clearly understand that for convenience and conciseness of description, specific working processes of the system, device, and unit described above can refer to the corresponding processes in the aforementioned method embodiments, and will not be repeated here.

The above description is only a specific implementation of the disclosure, but the scope of protection of the disclosure is not limited to these embodiments. Any changes or replacements that can easily be imagined by any skilled person familiar with the technical field within the scope of the disclosure should be covered within the scope of protection of the disclosure. Therefore, the scope of protection of the disclosure should be based on the scope of protection of the claims.

The invention claimed is:

1. A method for processing uplink data, performed by a terminal device, comprising:

sending first indication information to a network device based on a specified signaling radio bearer (SRB) during a small data transmission (SDT) process, wherein the first indication information indicates whether a non small data transmission data radio bearer (non SDT DRB) on the terminal device carries uplink data to be sent, the specified SRB is SRB1, the first indication information is carried on the SRB1, the SRB1 is configured to send a radio resource control (RRC) message for a dedicated control channel (DCCH) logical channel, the first indication information comprises a first identifier for indicating whether the non SDT DRB carries the uplink data to be sent.

2. The method according to claim 1, further comprising:

sending, by the terminal device, identifier information of the terminal device to the network device through a common control channel (CCCH); and deleting, by the terminal device, the identifier information of the terminal device from packet data convergence protocol PDCP data in the specified SRB, wherein the specified SRB is SRB1.

3. The method according to claim 1, wherein a buffer status report (BSR) is not triggered through the specified SRB during the SDT process; or wherein a priority of sending the specified SRB is set to be higher than a priority of sending the BSR during the SDT process.

4. The method according to claim 3, wherein the BSR is triggered through the specified SRB after ending the SDT process; or wherein the priority of sending the specified SRB is set to be lower than the priority of sending the BSR after the SDT process ends.

5. The method according to claim 1, wherein the first indication information further comprises at least one of:

a second identifier for indicating data amount of the uplink data to be sent carried in the non SDT DRB;

a third identifier for indicating data amount of the uplink data to be sent carried in a logical channel group to which the non SDT DRB belongs;

an identifier of the terminal device; and an identifier of the non SDT DRB.

6. The method according to claim 5, wherein the identifier of the non SDT DRB comprises at least one of:

a DRB identifier;

a logical channel identifier; and a logical channel group identifier.

7. The method according to claim 1, wherein sending the first indication information to the network device comprises:

determining that a first triggering condition is satisfied;

sending the first indication information to the network device.

8. The method according to claim 7, wherein the first triggering condition comprises any one of:

an amount of the uplink data to be sent in the non SDT DRB being greater than or equal to a first threshold value;

an amount of the uplink data to be sent in the non SDT DRB being less than or equal to a second threshold value;

the terminal device not sending a first access message Msg1 in a four-step random access;

the terminal device not sending a third access message Msg3 in the four-step random access;

the terminal device not sending a first access message MsgA in a two-step random access;

the terminal device not sending SDT data through a dedicated physical uplink shared channel (PUSCH); and the terminal device not generating a medium access control layer (MAC) protocol data unit (PDU) corresponding to data carried by an SDT DRB.

9. The method according to claim 7, further comprising:

receiving second indication information sent by the network device, wherein the second indication information indicates the first triggering condition.

10. The method according to claim 1, further comprising:

stopping the SDT process according to a second triggering condition.

11. The method according to claim 10, wherein the second triggering condition comprises any one of:

the terminal device not sending a first access message Msg1 in a four-step random access;

the terminal device not sending a third access message Msg3 in the four-step random access;

the terminal device not sending a first access message MsgA in a two-step random access;

the terminal device not sending SDT data through a dedicated PUSCH; and a priority of sending data carried by the non SDT DRB being higher than a priority of sending data carried by an SDT DRB.

12. The method according to claim 10, further comprising:

receiving third indication information sent by the network device, wherein the third indication information indicates the second triggering condition.

13. The method according to claim 1, further comprising:

setting a priority of sending the first indication information to be lower than a priority of sending data carried by an SDT DRB; or, setting a priority of sending data carried by the non SDT DRB to be lower than a priority of sending data carried by the SDT DRB.

14. The method according to claim 13, further comprising:

receiving fourth indication information sent by the network device, and determining that the SDT process ends based on the fourth indication information; or, determining that a specified SDT sending number is reached, and determining that the SDT process ends; or, determining that a specified SDT sending duration is reached, and determining that the SDT process ends.

15. The method according to claim 14, wherein the fourth indicator information comprises any one of:

a fourth access message Msg4 in a four-step random access;

a second access message MsgB in a two-step random access; and cell-radio network temporary identifier (C-RNTI).

16. The method according to claim 13, further comprising:

after the SDT process ends, setting a priority of sending a carrier channel configured to carry the first indication information to a priority of sending before changing; or after the SDT process ends, setting a priority of sending data carried by the non SDT DRB to a priority of sending before changing.

17. The method according to claim 1, further comprising:

setting a state of the non SDT DRB to a data transmission and reception state when the non SDT DRB carries the uplink data to be sent.

18. A method for processing uplink data, performed by a network device, comprising:

receiving first indication information sent by a terminal device based on a specified signaling radio bearer (SRB) during a small data transmission (SDT) process, wherein the first indication information indicates whether a non small data transmission data radio bearer (non SDT DRB) on the terminal device carries uplink data to be sent, the specified SRB is SRB1, the first indication information is carried on the SRB1, the SRB1 is configured to send a radio resource control (RRC) message for a dedicated control channel (DCCH) logical channel, the first indication information comprises a first identifier for indicating whether the non SDT DRB carries the uplink data to be sent.

19. A communication device, comprising a processor and a memory having a computer program stored thereon, wherein the processor is configured to execute the computer program stored in the memory, causing the device to implement:

sending first indication information to a network device based on a specified signaling radio bearer (SRB) during a small data transmission (SDT) process, wherein the first indication information indicates whether a non small data transmission data radio bearer (non SDT DRB) on the communication device carries uplink data to be sent, the specified SRB is SRB1, the first indication information is carried on the SRB1, the SRB1 is configured to send a radio resource control (RRC) message for a dedicated control channel (DCCH) logical channel, the first indication information comprises a first identifier for indicating whether the non SDT DRB carries the uplink data to be sent.

* * * * *